(12) United States Patent
Balcik et al.

(10) Patent No.: US 10,419,388 B2
(45) Date of Patent: Sep. 17, 2019

(54) METHOD AND SYSTEM FOR DARK MATTER SCANNING

(71) Applicants: James Balcik, St. Peter, MN (US); Lucas Gahler, Richfield, MN (US); Thusith Abeykoon, West Fargo, ND (US); Bruce Morgan, Glendale Heights, IL (US)

(72) Inventors: James Balcik, St. Peter, MN (US); Lucas Gahler, Richfield, MN (US); Thusith Abeykoon, West Fargo, ND (US); Bruce Morgan, Glendale Heights, IL (US)

(73) Assignee: Unisys Corporation, Blue Bell, PA (US)

( * ) Notice: Subject to any disclaimer, the term of this patent is extended or adjusted under 35 U.S.C. 154(b) by 37 days.

(21) Appl. No.: 15/610,946

(22) Filed: Jun. 1, 2017

(65) Prior Publication Data
US 2017/0272463 A1    Sep. 21, 2017

Related U.S. Application Data

(63) Continuation-in-part of application No. 14/798,847, filed on Jul. 14, 2015, now abandoned.

(51) Int. Cl.
*H04L 29/06* (2006.01)
*H04L 29/08* (2006.01)
(Continued)

(52) U.S. Cl.
CPC ........ *H04L 61/2007* (2013.01); *G06F 16/951* (2019.01); *G06F 21/577* (2013.01); *H04L 63/08* (2013.01); *H04L 63/1408* (2013.01); *H04L 67/141* (2013.01); *H04L 43/10* (2013.01); *H04L 61/6022* (2013.01)

(58) Field of Classification Search
CPC . H04L 61/2007; H04L 63/08; H04L 63/1408; H04L 67/141; H04L 43/10; H04L 61/6022; H04L 63/0428; H04L 29/06; H04L 29/08; H04L 29/12; G06F 21/577;
(Continued)

(56) References Cited

U.S. PATENT DOCUMENTS

| 9,241,010 B1* | 1/2016 | Bennett ................. H04L 63/145 |
| 2010/0188975 A1* | 7/2010 | Raleigh ............ G06Q 10/06375 |
| | | 370/230.1 |

* cited by examiner

*Primary Examiner* — Ashokkumar B Patel
*Assistant Examiner* — Quazi Farooqui (57) ABSTRACT

A method and system for scanning a computing system network for dark matter computing systems and computing devices. The method includes establishing a communication link between a master server and at least one target scanning agent that has at least one network computing system coupled thereto, creating a scanning job for the target scanning agent, building a scanning job command based on the scanning job, sending the scanning job command to the target scanning agent, receiving scanning job results from the target agent, parsing through the received scanning job results for identifying information of hosts in the network computing system detected during the scanning job, determining which detected hosts are known hosts and which detected hosts are unknown hosts based on the identifying information, and comparing the identifying information of the unknown hosts to reference identifying information to determine which of the unknown hosts are dark matter.

19 Claims, 9 Drawing Sheets

(51) Int. Cl.
*H04L 29/12* (2006.01)
*G06F 17/30* (2006.01)
*G06F 16/951* (2019.01)
*G06F 21/57* (2013.01)
*H04L 12/26* (2006.01)

(58) Field of Classification Search
CPC . G06F 17/30864; G06F 21/6218; G06F 17/30
USPC ........ 713/153, 168–176, 182–186, 202, 189,
713/193; 726/1–33; 709/206, 225, 229,
709/249, 389
See application file for complete search history.

METHOD AND SYSTEM FOR DARK MATTER SCANNING

RELATED APPLICATIONS

This application claims priority under 35 U.S.C. § 120 and is a continuation-in-part of U.S. application Ser. No. 14/798,847, entitled "Method and System for Dark Matter Scanning" and filed on Jul. 14, 2015. The entire contents of this application are hereby incorporated by reference.

BACKGROUND

Field

The instant disclosure relates to network computing systems, and in particular to scanning network computing systems and network devices.

Description of the Related Art

Computing system networks typically include a group of interconnected computing systems and computing devices. The computing systems and computing devices typically are linked together through communication channels to facilitate communication and the sharing of computing resources between the computing systems and computing devices.

The computing systems and computing devices within a given computing system network typically are authorized computing systems and devices native to the computing system network. However, a computing system network also may include one or more unknown, unmanaged, unauthorized or non-standard computing systems or devices that may be foreign to the computing system network. Such computing systems or devices are generally referred to as dark matter or dark matter computing systems and devices.

Dark matter systems and devices within a computing system network can present a risk to the security, authenticity and performance of the computing system network. The ability to identify and possibly remediate dark matter systems and devices within a computing system network can improve the overall management and operation of the computing system network. Also, the ability to recognize authorized computing systems and devices native to the computing system network from dark matter systems and devices that may be foreign to the computing system network likewise can improve the overall management and operation of the computing system network.

Conventional applications and tools exist that can determine the type and capabilities of endpoints within a particular network. However, such existing applications and tools typically use passive or indirect methods, such as monitoring traffic to and from network endpoints for information about those endpoints, to assist in identifying and determining network endpoints.

SUMMARY

Disclosed is a method and system for scanning a computing system network for dark matter computing systems and computing devices. The method includes establishing a communication link between a master server and at least one target scanning agent that has at least one network computing system coupled thereto, creating a scanning job for the target scanning agent, building a scanning job command based on the scanning job, sending the scanning job command to the target scanning agent, receiving scanning job results from the target agent, parsing through the received scanning job results for identifying information of hosts in the network computing system detected during the scanning job, determining which detected hosts are known hosts and which detected hosts are unknown hosts based on the identifying information, and comparing the identifying information of the unknown hosts to reference identifying information to determine which of the unknown hosts are dark matter. The system includes a master server for establishing a communication link with at least one target scanning agent that has at least one network computing system coupled thereto. The master server includes a dark matter server application (DMA) that has a scanning engine with a scheduling module for creating at least one scanning job for the target scanning agent, and a commander module for building a scanning job command from scanning job information received from the scheduling module and for sending the scanning job command to the target scanning agent identified in the scanning job command. The dark matter server application also includes at least one parser for receiving scanning job results from the target scanning agent, the parser parsing through the scanning job results for identifying information of all hosts in the network computing system detected during the scanning job. The dark matter server application determines which detected hosts are known hosts and which detected hosts are unknown hosts based on the identifying information. The dark matter server application also compares the identifying information of the unknown hosts to reference identifying information to determine which of the unknown hosts are dark matter.

DETAILED DESCRIPTION

In the following description, like reference numerals indicate like components to enhance the understanding of the disclosed methods and systems through the description of the drawings. Also, although specific features, configurations and arrangements are discussed hereinbelow, it should be understood that such is done for illustrative purposes only. A person skilled in the relevant art will recognize that other steps, configurations and arrangements are useful without departing from the spirit and scope of the disclosure.

Figure 1:
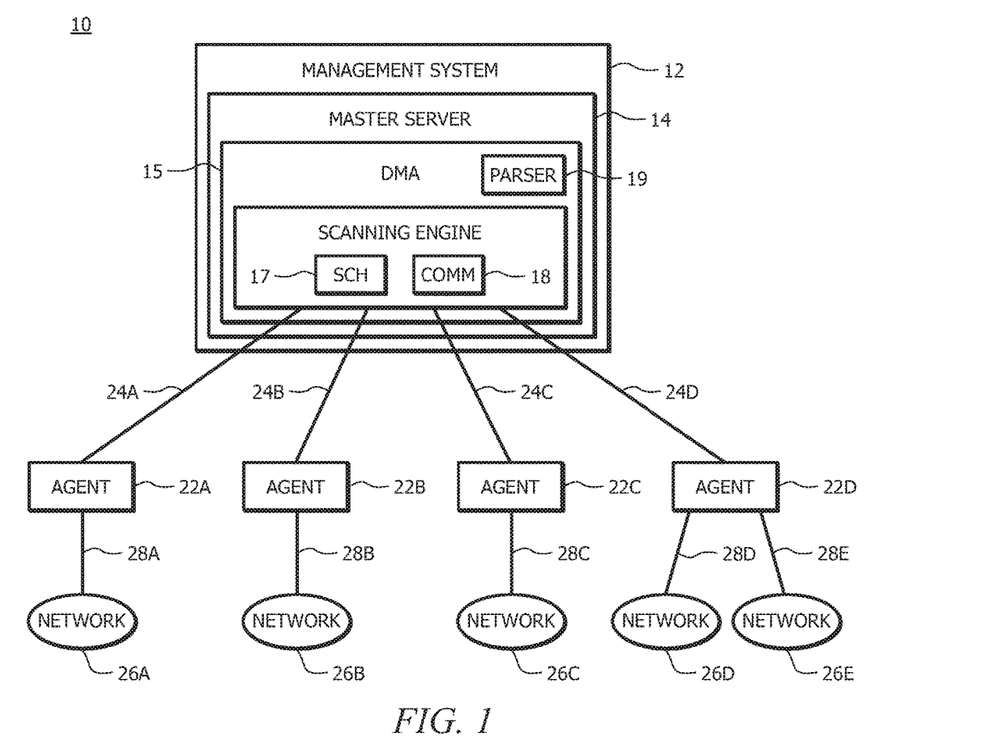
FIG. 1 is a schematic view of a dark matter scanning system or architecture, according to an embodiment.

FIG. 1 is a schematic view of a dark matter scanning system or architecture 10, according to an embodiment. The dark matter scanning system 10 seeks and obtains information from a computing system network that allows for the identification of managed, unmanaged, authorized, unauthorized, standard, non-standard, native and foreign computing system and devices within the computing system network.

The dark matter scanning system 10 includes a management system 12 and one or more scanning agents 22a-22d located across a network computing system. For example, the agents 22 are located across the network computing system according to their geographic areas and proximity to segments of the network computing system that are to be scanned. The management system 12 includes a master server 14, which includes a dark matter server application (DMA) 15. The dark matter server application 15 includes a scanning engine or module 16. The scanning engine or module 16 includes a scheduling module (SCH) 17 and a commander module (COMM) 18, both of which are described in greater detail hereinbelow. The dark matter server application 15 also includes one or more parsers 19, which also are described in greater detail hereinbelow.

The management system 12 is coupled to each of the agents 22a-22d by an appropriate communications link 24a-24d. Each agent 22 is coupled to one or more networks 26a-26e within the network computing system via an appropriate communications link 28a-28e. Each agent 22 is coupled to a single network (e.g., agent 22b is coupled to network 26b via communication link 28b), or coupled to more than one network (e.g., agent 22d is coupled to network 26d via communication link 28d, and coupled to network 26e via communication link 28e).

The master server 14, via the scanning module 16, is the processor or controller that executes the operations of the management system 12, and is in charge of issuing commands to and determining the status of the agents 22 deployed throughout the network computing system. The master server 14 and the scanning module 16 use a suitable operating system and additional modules to enable the master server 14 to issue commands to the agents 22, and to determine the connection status of the agents 22. The scanning module 16 includes an appropriate scanning or mapping tool, such as Nmap (network mapper).

The master server 14 includes one or more general purpose (host) controllers or processors that, in general, processes instructions, data and other information received by the management system 12. The master server 14 also manages the movement of various instructional or informational flows between various components within the master server 14. The master server 14 is configured to execute and perform one or more of the dark matter scanning steps described herein.

The master server 14 also can include a memory element or content storage element (not shown), coupled to the master server 14, for storing instructions, data and other information received and/or created by the management system 12. In addition to a memory element, the master server 14 can include at least one type of memory or memory unit (not shown) within the master server 14 for storing processing instructions and/or information received and/or created by the management system 12.

One or more of the master server 14 and the scanning engine 16 can be comprised partially or completely of any suitable structure or arrangement, e.g., one or more integrated circuits. Also, it should be understood that the management system 12 and the master server 14 each include other components, hardware and software (not shown) that are used for the operation of other features and functions of the system not specifically described herein.

At least a portion of the master server 14 can be implemented in hardware, firmware, or any combination thereof. In certain embodiments, the module(s) may be implemented in firmware that is stored in a memory and/or associated components and that are executed by the master server 14, or any other processor(s) or suitable instruction execution system. One of ordinary skill in the art will appreciate that any process or method descriptions associated with the master server 14 may represent modules, segments, logic or portions of code which include one or more executable instructions for implementing logical functions or steps in the process. It should be further appreciated that any logical functions may be executed out of order from that described, including substantially concurrently or in reverse order, depending on the functionality involved, as would be understood by those reasonably skilled in the art. Furthermore, the modules may be embodied in any non-transitory computer readable medium for use by or in connection with an instruction execution system, apparatus, or device, such as a computer-based system, processor-containing system, or other system that can fetch the instructions from the instruction execution system, apparatus, or device and execute the instructions.

The agents 22 are in charge of listening for any commands from the master server 14, carrying out any commands received from the master server 14, and reporting agent results back to the master server 14. Each of the agents 22 include an appropriate operating system for accomplishing these tasks. Also, appropriate encryption tools, such as secure shell (SSH) keys, can be used to authenticate the connection of each agent 22 to the master server 14. For example, as will be discussed in greater detail hereinbelow, an appropriate network connection tool (such as Plink) can be used to establish an SSH tunnel connection from the respective agent 22 to the master server 14.

Figure 2A:
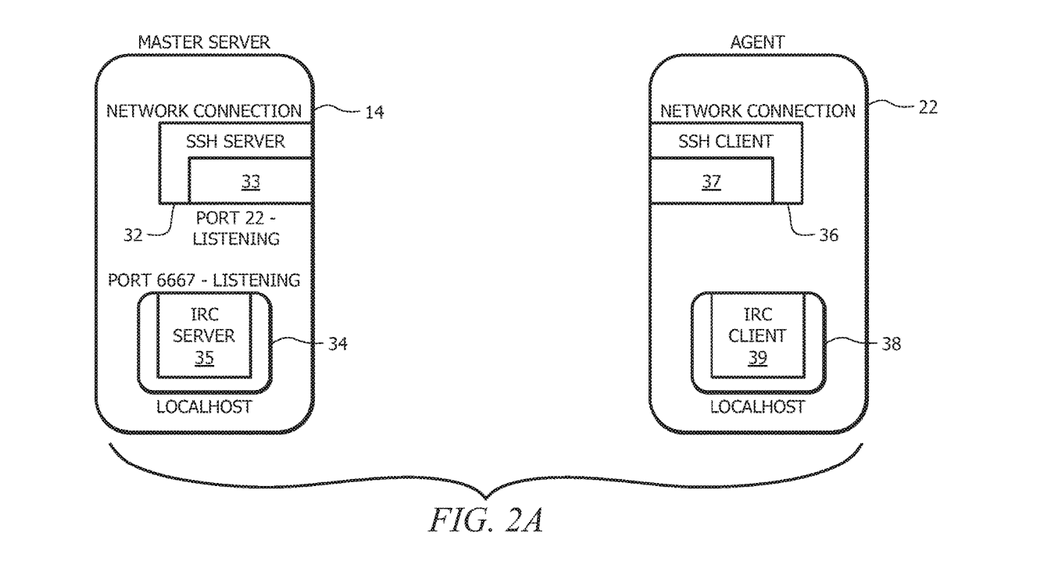
FIG. 2a is a schematic view of the master server and an agent within a dark matter scanning system or architecture, showing an initial status between the master server and the agent, according to an embodiment.

FIG. 2a is a schematic view of the master server 14 and an agent 22 within a dark matter scanning system or architecture, showing an initial status between the master server 14 and the agent 22, according to an embodiment. The master server 14 includes a first server network connection port 32, e.g., an Internet socket port, that functions as a server port for connecting with the agent 22 and listening for incoming connections from the agent 22. For example, the first server network connection port 32 can be Internet socket port 22. The first server network connection port 32 includes an SSH server application module 33 for performing the functions of the first server network connection port 32. The master server 14 also includes a second server network connection port 34, e.g., an IRC (Internet Relay Chat) server port, that functions as a localhost port for connection with the agent 22. For example, the second server network connection port 34 can be Internet socket port 6667. The second server network connection port 34 includes an IRC server application module 35 for performing the functions of the second server network connection port 34.

The agent 22 includes a first client network connection port 36, e.g., an Internet socket port, that functions as a client port for connecting with the master server 14 and listening for incoming commands and instructions from the master server 14. The first client network connection port 36 includes an SSH client application module 37 for performing the functions of the first network connection port 36. The agent 22 also includes a second client network connection port 38, e.g., an IRC client port, that functions as a localhost port for connection with the master server 14. For example, the second network connection port 38 can be Internet socket port 8888. The second client network connection port 38 includes an IRC client application module 39 for performing the functions of the second client network connection port 34. For example, the IRC client application module 39 monitors an IRC control channel or other appropriate control channel to look for commands from the master server 14.

Figure 2B:
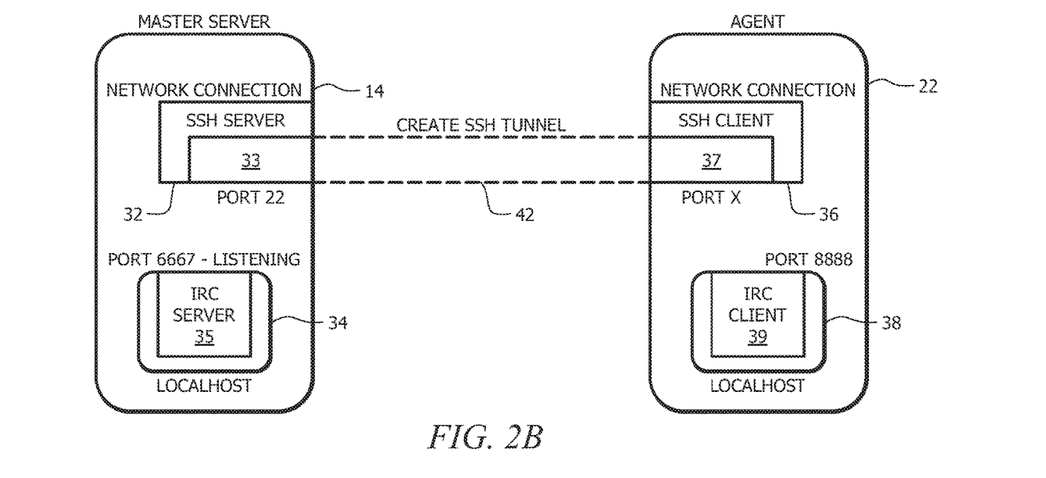
FIG. 2b is a schematic view of the master server and an agent within a dark matter scanning system or architecture, showing the creation of a secure shell tunnel channel, according to an embodiment.

FIG. 2b is a schematic view of the master server 14 and an agent 22 within a dark matter scanning system or architecture, showing the creation of a secure shell (SSH) tunnel channel 42, according to an embodiment. SSH tunnels or other appropriate communication channels are used for connections between the master server 14 and the agents 22. Although the use of SSH tunnels may increase complexity and initial setup configuration time, the use of SSH tunnels greatly enhances security in many ways. For example, the threat surface of the master server 14 is minimal because an external scan will not show the IRC server on any ports of the master server 14. While the first connection port 32 (e.g., port 22/TCP (SSH)) is visible, unless a possible security threat is able to figure out valid login credentials, the first connection port 32 will not be the source of any security breach to the master server 14. Also, due to the use of a secure tunnel channel, such as an SSH tunnel channel, the purpose or intended use of the master server 14 is not revealed. Moreover, it is not possible for an attacker to detect data traffic sent from the master server 14 via the first connection port 32 for possible clues as to what the master server 14 is doing.

Also, the administrators of the dark matter scanning system 10 have SSH credentials to the master server 14. Each of the administrators typically will be running a network connection tool (such as Plink) on their systems to establish the SSH tunnel channel 42. Once the SSH tunnel channel 42 is established, each administrator runs their IRC client of choice with the appropriate connection information to connect to the master server 14.

Figure 2C:
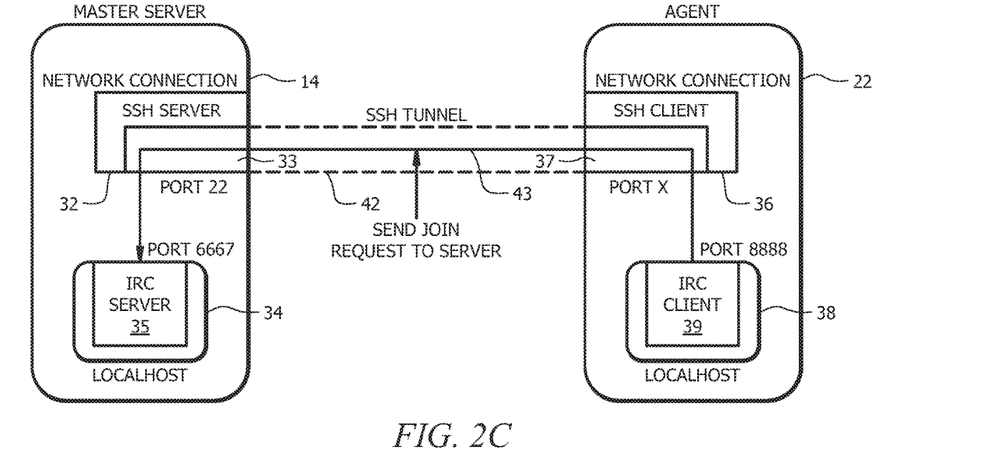
FIG. 2c is a schematic view of the master server and an agent within a dark matter scanning system or architecture, showing the agent joining the secure shell tunnel channel, according to an embodiment.

FIG. 2c is a schematic view of the master server 14 and an agent 22 within a dark matter scanning system or architecture, showing the agent joining the IRC channel on the IRC server application module 35, according to an embodiment. Once the SSH tunnel channel 42 has been created, the agent 22 joins the IRC channel on the IRC server application module 35. To join the IRC channel on the IRC server application module 35, the SSH client application module 37 within the second network connection port 38 (IRC client port) sends a Join request 43, via the SSH tunnel channel 42, to the master server 14. The Join request 43 is received by the SSH server application module 33 within the first network connection port 32 of the master server 14 via the SSH tunnel channel 42, and forwarded to the IRC server application module 35 within the second network connection port 34 (IRC server port). When the Send request is recognized and approved by the master server 14 (e.g., via a Join confirmation from the master server 14 to the agent 22), the agent 22 has joined the IRC channel on the IRC server application and is then properly connected to the master server 14.

Figure 2D:
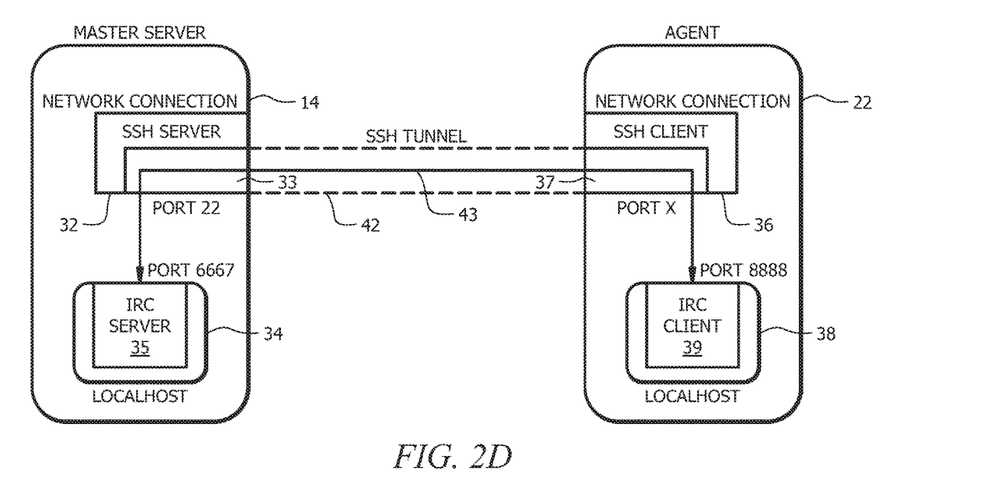
FIG. 2d is a schematic view of the master server and an agent within a dark matter scanning system or architecture, showing communication between the master server and the agent, according to an embodiment.

FIG. 2d is a schematic view of the master server 14 and an agent 22 within a dark matter scanning system or architecture, showing communication between the master server 14 and the agent 22, according to an embodiment. Once the agent 22 has joined the IRC channel on the IRC server application module 35, and a proper communication link has been established between the master server 14 and the agent 22, the master server 14 and the agent 22 can begin communicating with one another.

The master server 14 is the master controller of all the agents 22. As discussed hereinabove, the master server 14 is the location within the management system 12 where the SSH server application 33, the IRC server application 35 and the dark matter server application 15 run. All communication between the master server 14 and the agents 22 happen over SSH tunnels. The SSH tunnels keep traffic between the master server 14 and the agents 22 secure and encrypted. When the master server 14 is running an IRC server application 35, the IRC server application 35 is listening only on localhost. This masks the presence of the IRC server application 35 from network probes. The only way to communicate with the IRC server application 35 is to create an SSH tunnel. The use of the IRC server application 35 allows future development of other types of agents that perform other missions beyond scanning for dark matter. The use of the IRC server application 35 also scales up easily to allow for future expansion. However, it should be understood that other appropriate server applications can be used instead of the IRC server application 35 to perform at least a portion of the functions of the master server 14.

Within the master server 14, the application module data and data collected from scanning processes can be stored in any suitable data storage arrangement. For example, the folder structure of the data stored on the master server 14 can include a main dark matter folder (dm), which has a main dark matter server sub-folder (dm_server-v#.##). Within the main dark matter server sub-folder, there can be a buckets sub-folder (buckets), which contains the IP address range for files for scanning jobs. The buckets sub-folder can include a real_buckets sub-folder (Real-Buckets), where includes a backup copy of the original IP range files for scanning. The main dark matter server sub-folder also can include a log sub-folder (logs), an output sub-folder (output), a scripts/code sub-folder (scripts), and a transfer sub-folder (xfer), where results from dark matter agents (bots) are transmitted. The xfer sub-folder can include an nmap-xml-parsed sub-folder (nmap-xml-parsed), which stores nmap xml files from the xfer folder once the nmap xml files have been parsed. The xfer sub-folder also can include an nmap-xml-to-csv sub-folder (nmap-xml-to-csv), where the parsed nmap xml files are converted into csv files (or other appropriate file type) for subsequent import into an appropriate database application, e.g., a MySQL database.

Referring again to FIG. 1, the scanning engine 16 typically includes one or more modules responsible for scheduling scanning jobs and for managing IP address ranges. The scheduling module 17 creates a scanning job for each network region. A scanning job contains the appropriate information for a particular scan, e.g., what days of the week and what time(s) to perform a scanning job. Scanning job IP address ranges are managed by an appropriate management means, e.g., by using IN and OUT buckets. For example, the IN bucket keeps track of IP address ranges to be scanned and the OUT bucket keeps track of IP address ranges that have been scanned.

When a schedule for a particular scanning job is reached, the scheduling module 17 invokes a commander module 18, which also can be located within the scanning engine 16. The scheduler module 17 sends the appropriate arguments to the commander module 18 when the commander module 18 is invoked. For example, a first argument is the "–r<region>". This argument tells the commander module what region is to be scanned. A second argument is the "–t<target>". This argument tells the commander module what target IP address range(s) is/are to be scanned.

The commander module 18 assigns regions to the agents 22. The commander module parses the arguments sent by the scheduling module 17 and builds a scanning job command to send to the particular agent 22. The commander module 18 connects to the IRC server 35 (FIG. 2) and sends the scanning job command message to the appropriate agent 22. The agent 22 to which the scanning job command message is sent receives the scanning job command and performs the appropriate scan of the network region for which the agent has been assigned.

Each agent 22 operates like an IRC bot. The agent 22 connects to the IRC server 35 and joins a specific channel. Once the agent 22 joins a specific channel, the agent awaits special commands to be issued thereto. To issue these commands, the commander module 18 sends a private message in a specific syntax to the agent 22. In this manner, the management system 12, including the master server 14, can command and monitor as many agents 22 as desired.

Within an agent 22, agent data can be stored in any suitable data storage arrangement. For example, the folder structure of the data stored on an agent 22 can include a main dark matter folder (dm), which has a main dark matter agent (bot) sub-folder (dm_scan_bot#.##). Within the main dark matter server sub-folder, there can be a log sub-folder (log), an output sub-folder (output), a scripts/code sub-folder (scripts).

The agent 22 connects to the IRC server 35 and joins the "#dm_scanners" channel. Via the "#dm_scanners" channel, the agent 22 listens for private messages that contain agent commands. For example, agent commands begin with "!". For example, a !menu agent command displays all currently implemented agent commands, a !info agent command displays the hostname and IP address of the agent host system, and a !dmscan agent command performs a dark matter scan.

Once an agent 22 receives a !dmscan agent command, the agent 22 spawns a new process for each target IP range so that each target range is scanned in parallel to any other scans. This new process executes "dm_scan_bot-dmscan-v#.##.py," which is the process that performs the dark matter scanning.

The dmscan process is the worker for performing dark matter scanning. The first part of the dmscan process is to perform a ping sweep of the target IP range. The ping sweep is performed using a suitable ping sweep process that properly detects all reachable hosts in the target IP range. Many conventional ping sweep processes are not all inclusive. For example, a conventional Nmap's ping sweeping method does not detect all hosts that are reachable on the network. The ping sweep process used according to an embodiment replicates the method a Windows system would use to ping a Windows system, but allowing for better scripting ability. Once the ping sweep process is completed, the live hosts that are detected are then scanned (using a basic scan) for NetBios names and media access control (MAC) addresses (NetBios scan) using a specially-crafted Nmap command.

After the NetBios scan is completed, the live hosts then are scanned (using a deep scan) to identify the device type and the device operating system (DeviceID scan), using a specially-crafted Nmap command. The output from the NetBios scan and the DeviceID scan are stored in the agent output folder, e.g., in XML format. Once the output (e.g., the XML files) from the NetBios scan and the DeviceID scan is dumped into the agent output folder, the output information is then transferred to the master server 14 and stored in the "xfer" folder on the master server 14.

Once the XML files are transferred into the "xfer" folder on the master server 14, the dark matter parsers 19 (e.g., dark matter Nmap XML parsers) parse the XML results into files of an appropriate format, such as custom character-separated values (CSV) files, which are imported into an appropriate database application, e.g., a MySQL database.

A NetBios parser, e.g., an Nmap-xml-netbios-parser, parses through the XML files generated from the NetBios scan for Netbios names and MAC addresses. The Nmap-xml-netbios-parser generates a custom CSV file to be imported into the "xfer/nmap-xml-to-csv" folder of the MySQL database. Once the XML files have been parsed, the process moves the XML files into the "xfer/nmap-xml-parsed" folder.

A DeviceID parser, e.g., an Nmap-xml-deviceID-parser, parses through the XML files generated from the DeviceID scan for device type and device operating system. The Nmap-xml-deviceID-parser generates a custom CSV file that is imported into the "xfer/nmap-xml-to-csv" folder. Once the XML files have been parsed, the process moves the XML files into the "xfer/nmap-xml-parsed" folder.

Figure 3:
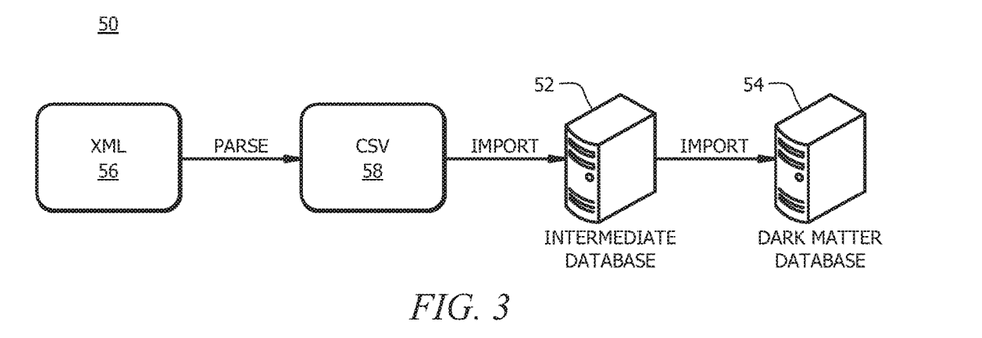
FIG. 3 is a schematic view of the dark matter databases, according to an embodiment.

FIG. 3 is a schematic view 50 of the dark matter databases, according to an embodiment. The management system 12 can include one or more suitable databases for storing various scanning data, e.g., a dark matter intermediate database 52 and a main dark matter database 54. The dark matter intermediate database 52 contains the initial data collected directly by the scanning agents. After the parsers convert the XML scanning result output 56 into CSV files 58, the converted data 58 is imported into the dark matter intermediate database 52. The dark matter intermediate database 52 stores the initial scanning results, and makes it easier to update or change any of the data before moving the data into the main dark matter database 54.

When data is being stored into the dark matter intermediate database 52, various information about each host is collected from the scanning results, e.g., the IP address, the NetBIOS name, the domain name system (DNS) name, the MAC address, the scanned date, the scanned time, the device type, the device operating system, and the device status.

Data from the CSV files is imported directly into the intermediate database. In a data table of the imported data, the IP address can be the primary key to identifying data. After the scanning process is complete, all of the data in the dark matter intermediate database 52 is exported into CSV files and imported to the main dark matter database 54 for further processing.

The main dark matter database 54 is the main database where the final results of the dark matter scanning process are imported. The main dark matter database 54 also is where appropriate processes, e.g., structured query language (SQL) processes, run that look up system center configuration manager (SCCM) information and Symantec Endpoint Protection (SEP) information. If SCCM information and/or SEP information is found, that information is added to the data records.

Figure 4:
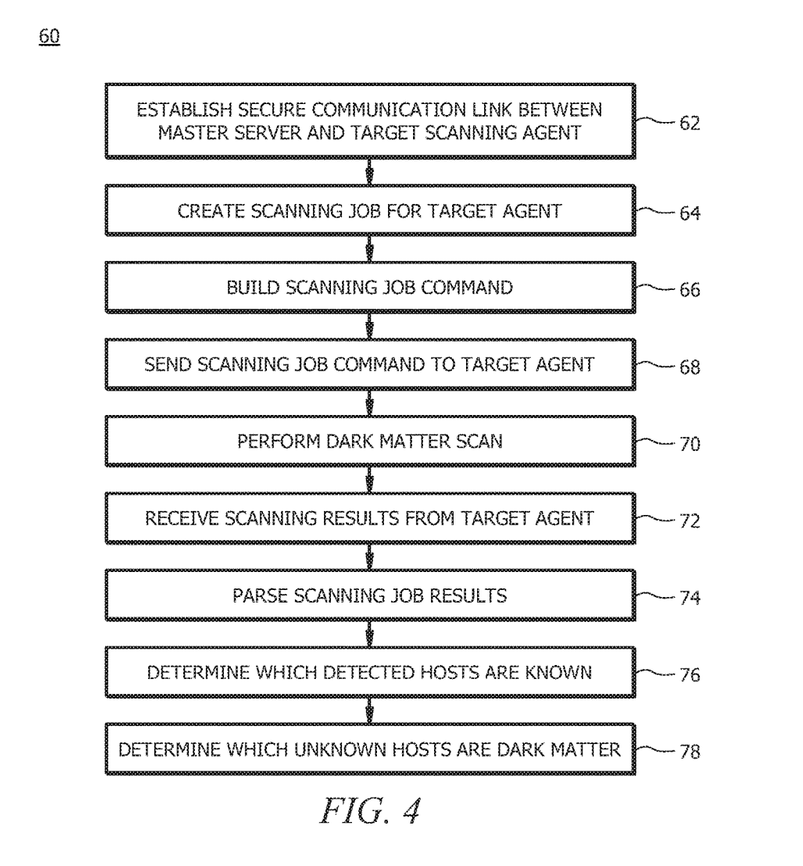
FIG. 4 is a flow diagram of a method for scanning a computing system network for dark matter, according to an embodiment.

FIG. 4 is a flow diagram of a method 60 for scanning a computing system network for dark matter, according to an embodiment. The method 60 includes a step 62 of establishing a secure communication link between the master server 14 and the target agent 22. As discussed hereinabove, an SSH tunnel channel or other appropriate secure communication link is established between the master server 14 and the target agent 22 to allow the master server 14 and the target agent 22 to securely communicate with one another.

The method 60 also includes a step 64 of creating a scanning job for the target agent. As discussed hereinabove, the scheduling module 17 within the scanning engine 16 creates a scanning job for each network region. The scanning job contains the appropriate information for a particular scanning job.

The method 60 also includes a step 66 of building a scanning job command. As discussed hereinabove, once a created scanning job has been reached, i.e., scheduled, the scheduling module 17 invokes the commander module 18 and sends the appropriate scanning job information to the commander module 18. The commander module 18 assigns a particular region or regions to the target agent 22, and builds a scanning job command based on the scanning job information provided by the scheduling module 17.

The method 60 also includes a step 68 of sending the scanning job command to the target agent 22. As discussed hereinabove, once the commander module 18 has built the scanning job command, the commander module 18 connects to the IRC server 35 and sends the scanning job command to the target agent 22.

The method 60 also includes a step 70 of performing a dark matter scan. As discussed hereinabove, once the target agent 22 has received the scanning job command, the target agent 22 performs the appropriate scan or scans of the network region for which the agent has been assigned. The target agent 22 uses a dark matter scanning process (dmscan) that detects all live or reachable hosts in the target IP range. The detected hosts then are scanned using a NetBios scan to determine the NetBios names and the Mac addresses for all detected hosts. The detected hosts then are scanned using a DeviceID scan to determine the device type and the device operating system of the detected hosts. The detected hosts also may be further scanned for other identifying information.

The method 60 also includes a step 72 of receiving the scanning results from the target agent 22. Once the target agent 22 has performed the NetBios scan and the DeviceID scan of the detected hosts, the identifying information resulting from those scans are stored in the agent output folder, e.g., in XML format. Once the output files have been dumped into the agent output folder, the target agent 22 transfers the scan output results to the master server 14, where the scan output results are stored in the "xfer" folder on the master server 14.

The method 60 also includes a step 74 of parsing the scanning results. Once the output files from the scans are transferred into the "xfer" folder on the master server 14, the dark matter parsers 19 parse the output files from the scans.

More specifically, the Netbios parser parses through the XML files generated from the NetBios scan for Netbios names and MAC addresses. Also, the DeviceID parser parses through the XML files generated from the DeviceID scan for device type and device operating system. Once the XML files have been parsed, the process moves the XML files into the "xfer/nmap-xml-parsed" folder.

The method 60 also includes a step 76 of determining which hosts detected by the target agent 22 are known hosts. Once the identifying information from the detected hosts is obtained and parsed, the identifying information of a particular detected host is used to determine whether the detected host is a known host or an unknown host. The hosts are categorized based on criteria for setting the status field.

The method 60 also includes a step 78 of determining which of the unknown hosts are dark matter. Once a detected host has been determined to be an unknown host, the identifying information of that unknown host is used to determine whether or not that unknown host is dark matter. This determination is made based on the status field.

Figure 5:
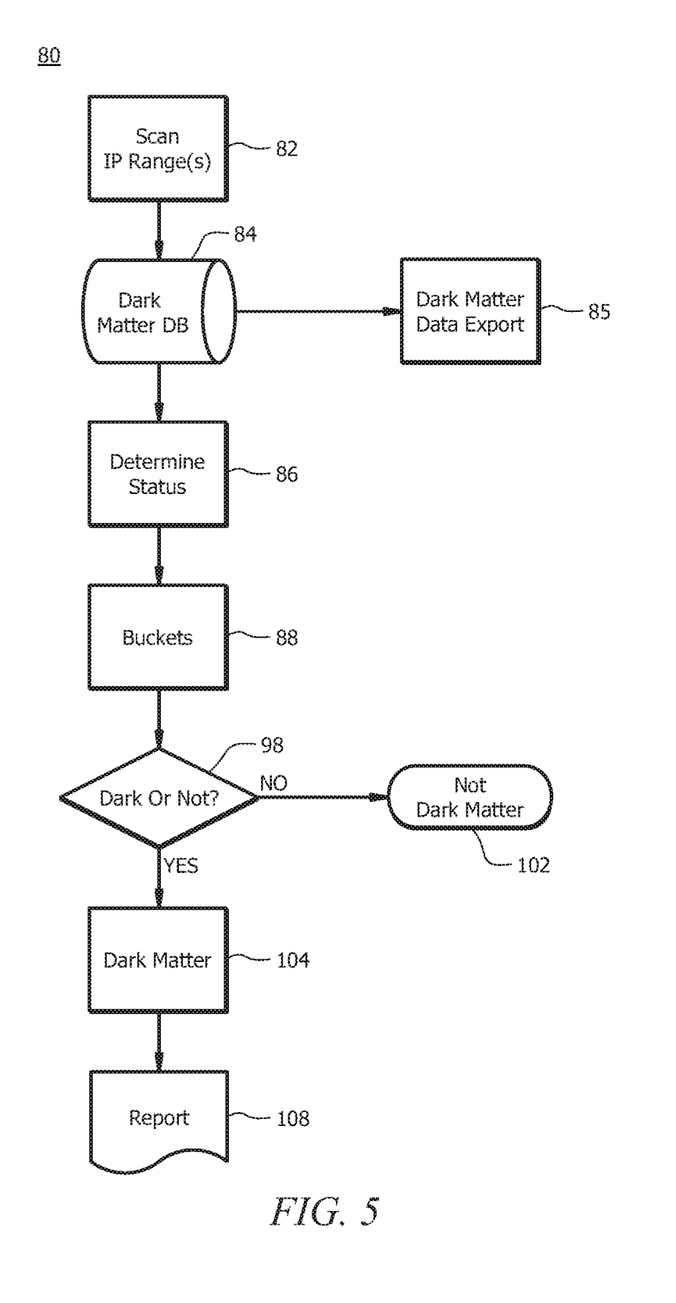
FIG. 5 is a process flow diagram of a method for scanning a computing system network for dark matter, according to an embodiment.

FIG. 5 is a process flow diagram 80 of a method for scanning a computing system network for dark matter, according to an embodiment. The method 80 includes a step 82 of scanning a portion of a computing system network, e.g., a portion of the IP address space of the computing system network. As discussed hereinabove, various scans are created and executed within various regions of the computing system network.

The method 80 also includes a step 84 of recording the results of the scans, e.g., recording all responsive IP addresses. As discussed hereinabove, identifying information is collected and recorded for all detected hosts within the scanned region of the computing system network. The information collected from the scans is stored in one or more dark matter databases, as discussed hereinabove.

The method 80 also can include a step 85 of exporting at least a portion of the dark matter data stored in the one or more dark matter databases, e.g., as discussed hereinabove.

The method 80 also includes a decision step 86 of determining the status of each responsive IP address. That is, the decision step 86 determines whether each responsive IP address represents an unknown host (i.e., dark matter) or a known host (i.e., a known server/system, a known network component, a known printer, or some other known system or device). The decision step 86 will be described in further detail hereinbelow, with respect to FIG. 7.

The method 80 also includes a step 88 of providing a "bucket" setting for the status of each responsive IP address as determined by the status determining step 86. The bucket setting step 88 will be described in further detail hereinbelow, with respect to FIG. 8.

The method 80 also includes a decision step 98 of determining whether each of the unknown hosts, as determined by the decision step 86, is dark matter or not dark matter. According to the dark matter determining step 98, if the identifying information about the unknown host compares favorably to the SCCM information, SEP information and other information in the existing databases, the unknown host is determined not to be dark matter (NO), shown generally as a not dark matter step 102. If the identifying information about the unknown host does not compare favorably to the SCCM information, SEP information and other information in the existing databases, the unknown host is determined to be dark matter (YES), shown generally as dark matter step 104.

The method 80 also can include a reporting step 108. The reporting step 108 generates one or more various reports detailing the findings of the unknown hosts, and whether or not the unknown hosts are determined to be dark matter. For example, the reporting step 108 can generate a dark matter report and a remediation report. The reporting step 108 will be described in further detail hereinbelow, with respect to FIG. 9.

Figure 6:
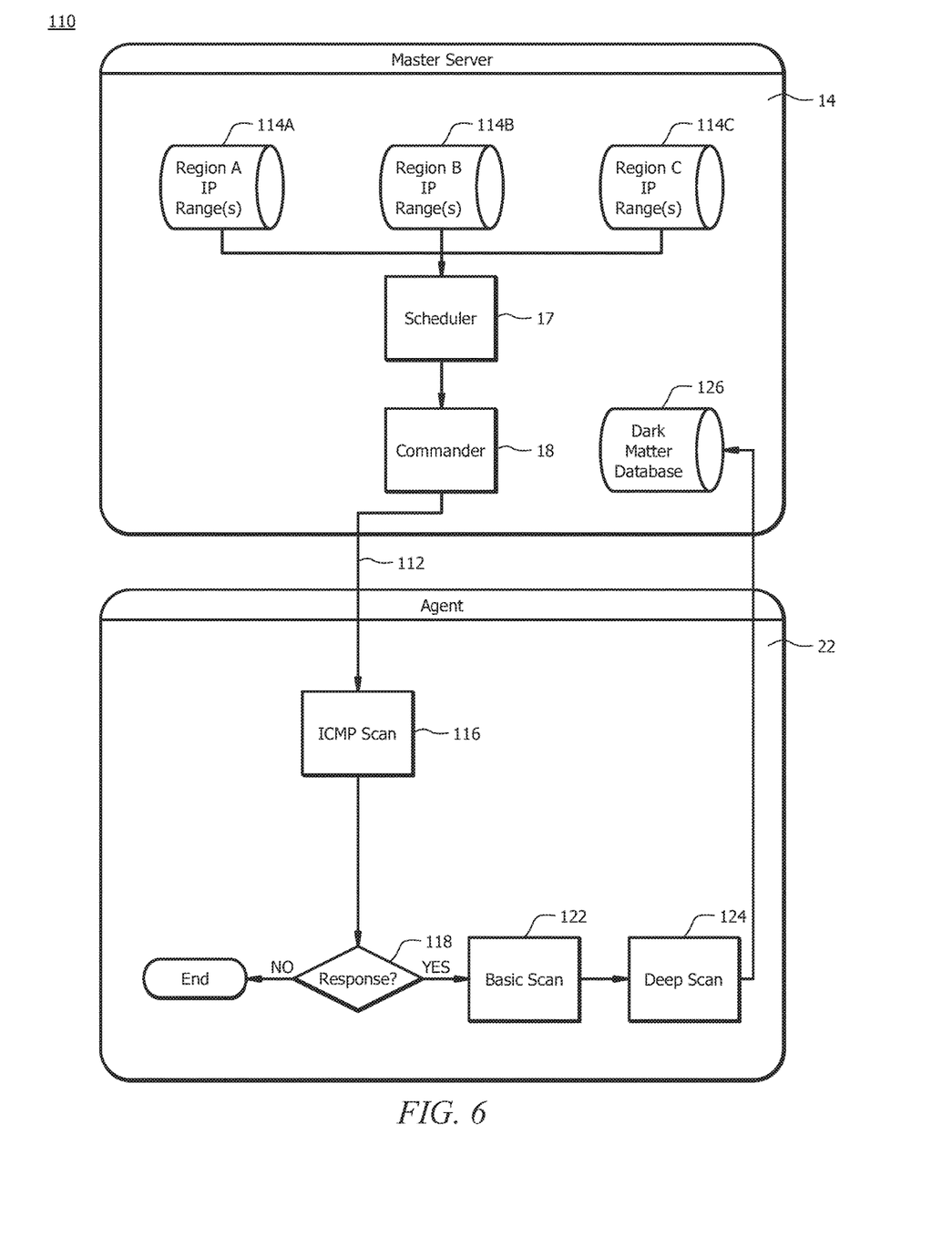
FIG. 6 is a schematic view of the master server and an agent within a dark matter scanning system or architecture, showing various process flows therebetween, according to an embodiment.

FIG. 6 is a schematic view 110 of the master server 14 and a target agent 22 within a dark matter scanning system or architecture, showing various process flows therebetween, according to an embodiment. As discussed hereinabove, a secure communication link 112 is established between the master server 14 and the target agent 22.

The master server 14 creates a scanning job for the target agent 22, i.e., a scanning job for a portion of a computing system network for which the target agent 22 has been assigned, e.g., a portion of the IP address space of the computing system network for which the target agent 22 has been assigned (e.g., region A IP ranges 114a, region B IP ranges 114b and region C IP ranges 114c). As discussed hereinabove, the scheduling module 17 creates a scanning job for each network region and, once a created scanning job has been reached (i.e., scheduled), the scheduling module 17 invokes the commander module 18 and sends the appropriate scanning job information to the commander module 18. As discussed hereinabove, the commander module 18 assigns a particular region or regions to the target agent 22, and builds a scanning job command based on the scanning job information provided by the scheduling module 17. Once the commander module 18 has built the scanning job command, the commander module 18 connects to the IRC server within the master server 14 and sends the scanning job command to the target agent 22.

Within the target agent 22, an Internet Control Message Protocol (ICMP) scan 116 is performed. As discussed hereinabove, once the target agent 22 has received the scanning job command, the target agent 22 performs the appropriate scan or scans of the network region(s) for which the target agent 22 has been assigned. The ICMP scan 116 determines whether or not a response (shown as 118) is received from each of the hosts in the network region(s) for which the target agent 22 has been assigned. That is, the ICMP scan 116 detects all live or reachable hosts (response=YES) in the target IP range.

Once the ICMP scan has been performed and all of the live hosts are detected, the live hosts are then scanned using a basic scan 122. As discussed hereinabove, the basic scan 122 determines the NetBios names and the Mac addresses for all detected hosts. The detected hosts then are scanned using a deep (DeviceID) scan 124 to determine the device type and the device operating system of the detected hosts. As discussed hereinabove, the detected hosts also may be further scanned for other identifying information.

Once the target agent 22 has identified all live or reachable hosts in the target IP range, performed the basic scan of the detected hosts and performed the deep scan of the detected hosts, the identifying information resulting from those scans of the detected hosts is transferred to the master server 14, where the scan output results ultimately are collected and stored in one or more dark matter databases (shown in this figures as dark matter database 126).

Figure 7:
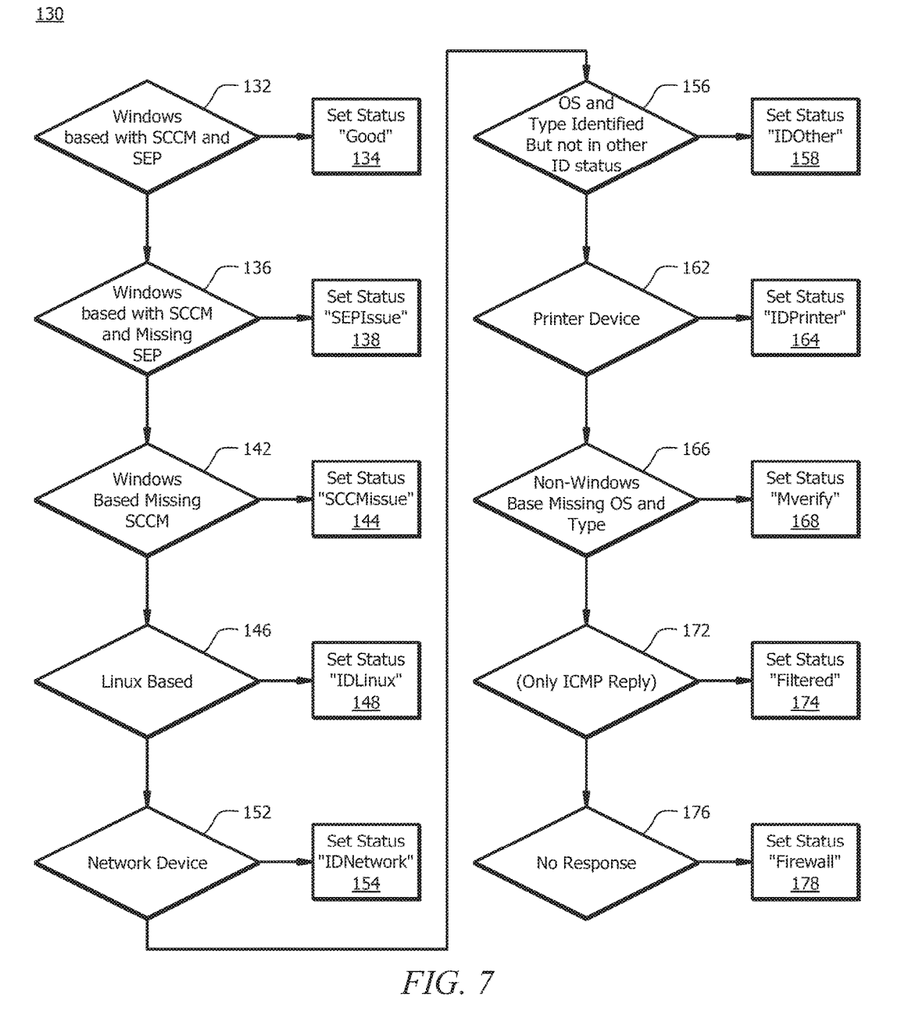
FIG. 7 is a process flow diagram of the status determining step of FIG. 5, according to an embodiment.

FIG. 7 is a process flow diagram 130 of the status determining step of FIG. 5, according to an embodiment. As discussed hereinabove, the status of each responsive IP address is determined (decision step 86 in FIG. 5). A status field defines the state of a particular device (i.e., responsive IP address). For example, if a device is determined to be Windows based with SCCM and SEP (shown as 132), the status field for that particular device is set to "Good" (shown as 134). If a device is determined to be Windows based with SCCM but missing SEP (shown as 136), the status field for that particular device is set to "SEPIssue" (shown as 138). If a device is determined to be Windows based but missing SCCM (shown as 142), the status field for that particular device is set to "SCCMIssue" (shown as 144). If a device is determined to be Linux based (shown as 146), the status field for that particular device is set to "IDLinux" (shown as 148). If a device is determined to be a network device, (shown as 152), the status field for that particular device is set to "IDNetwork" (shown as 154).

If a device is determined by identifying its operating system and device type, but is not in any other ID status category (shown as 156), the status field for that particular device is set to "IDOther" (shown as 158). If a device is determined to be a printer device (shown as 162), the status field for that particular device is set to "IDPrinter" (shown as 164). If a device is determined to be a non-Windows base, but its operating system and device type were not identified (shown as 166), the status field for that particular device is set to "MVerify" (shown as 168). If a device provided only an ICMP reply (shown as 172), the status field for that particular device is set to "Filtered" (shown as 174). If a device provided no response (shown as 176), the status field for that particular device is set to "Firewall" (shown as 178).

Figure 8:
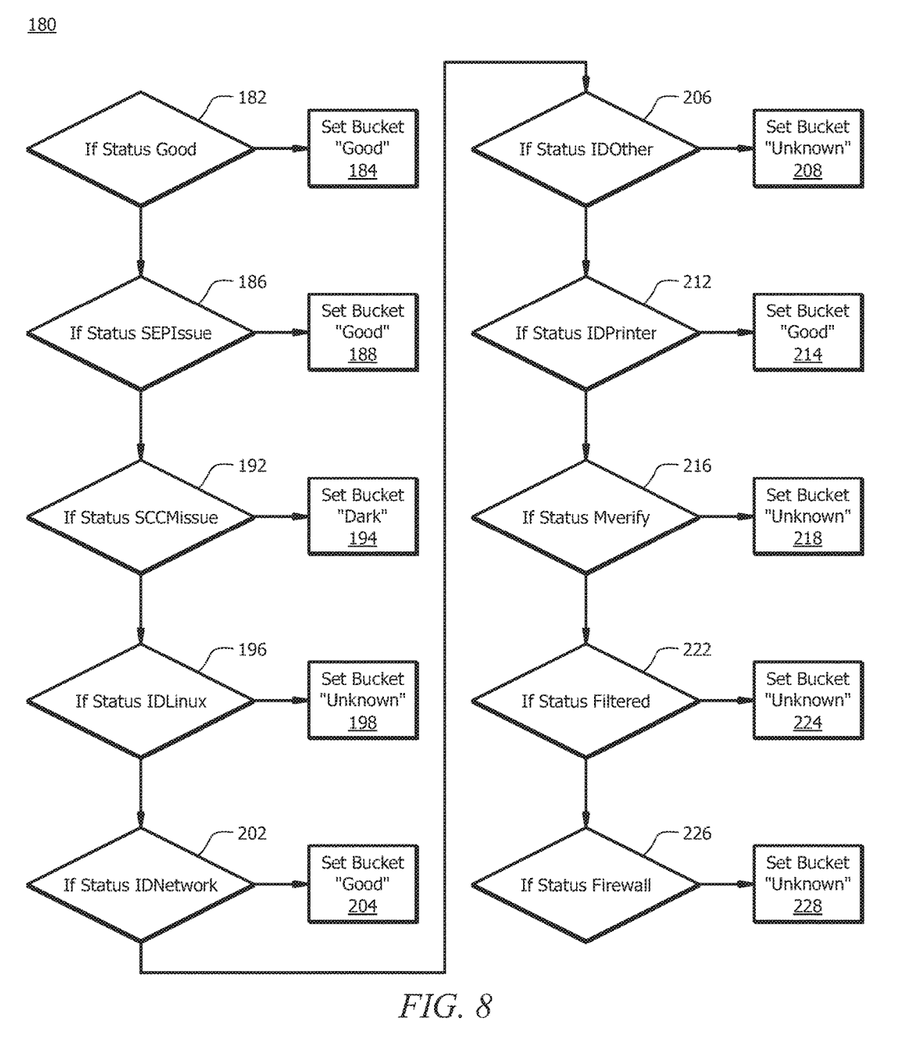
FIG. 8 is a process flow diagram of the bucket setting step of FIG. 5, according to an embodiment.

FIG. 8 is a process flow diagram 180 of the bucket setting step 88 of FIG. 5, according to an embodiment. As discussed hereinabove, according to the bucket setting step 88 in FIG. 5, a "bucket" setting is provided for the status of each responsive IP address as determined by the status determining step 86 in FIG. 5. For example, if the status of a device is set to "Good" (shown as 182), the bucket setting for that particular device is set to "Good" (shown as 184). If the status of a device is set to "SEPIssue" (shown as 186), the bucket setting for that particular device is set to "Good" (shown as 188). If the status of a device is set to "SCCMIssue" (shown as 192), the bucket setting for that particular device is set to "Dark" (shown as 194). If the status of a device is set to "IDLinux" (shown as 196), the bucket setting for that particular device is set to "Unknown" (shown as 198). If the status of a device is set to "IDNetwork" (shown as 202), the bucket setting for that particular device is set to "Good" (shown as 204).

If the status of a device is set to "IDOther" (shown as 206), the bucket setting for that particular device is set to "Unknown" (shown as 208). If the status of a device is set to "IDPrinter" (shown as 212), the bucket setting for that particular device is set to "Good" (shown as 214). If the status of a device is set to "MVerify" (shown as 216), the bucket setting for that particular device is set to "Unknown" (shown as 218). If the status of a device is set to "Filtered" (shown as 222), the bucket setting for that particular device is set to "Unknown" (shown as 224). If the status of a device is set to "Firewall" (shown as 226), the bucket setting for that particular device is set to "Unknown" (shown as 228).

Figure 9:
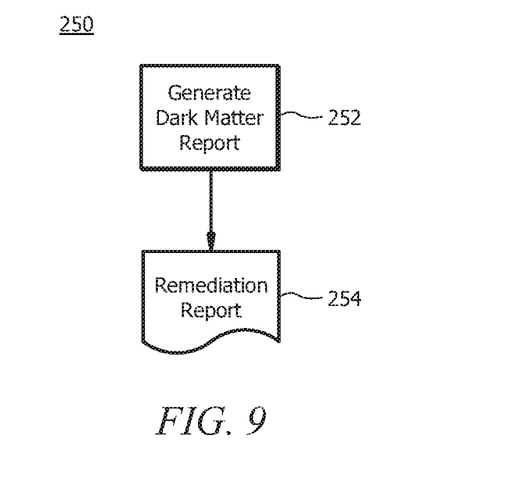
FIG. 9 is a process flow diagram of dark matter reporting, according to an embodiment.

FIG. 9 is a process flow diagram 250 of dark matter reporting, according to an embodiment. As discussed hereinabove, the reporting step 108 (FIG. 5) generates one or more various reports detailing the findings of the unknown hosts, and whether or not the unknown hosts are determined to be dark matter. The process flow diagram 250 includes a reporting process 252 that can generate any number of reports with any data from the dark matter database. For example, the reporting process 252 can generate a remediation report 254.

Figure 10:
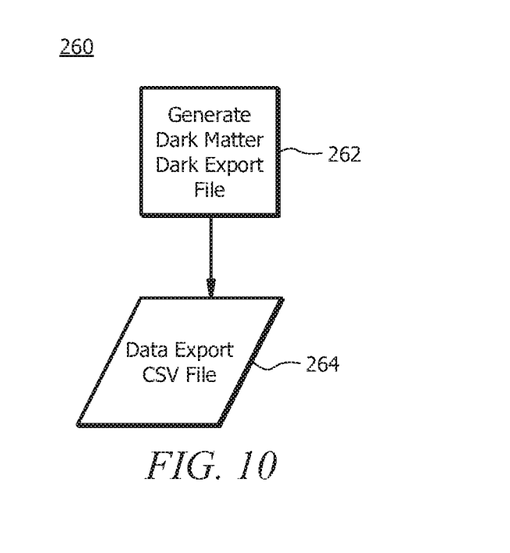
FIG. 10 is a process flow diagram of dark matter data exports, according to an embodiment.

FIG. 10 is a process flow diagram 260 of dark matter data exports, according to an embodiment. As discussed hereinabove, the main dark matter database 54 (FIG. 3) is the main database where the final results of the dark matter scanning process are imported. The process flow diagram 260 includes a export file generation process 262 that creates CSV export files. The process flow diagram 260 also includes a data exporting process 264 in which all or a portion of the information collected by and stored in the main dark matter database 54 can be exported as one or more export files. Typically, the entire contents of the dark matter database are exported for use as source data for other reporting systems.

The following table (Scan Table) is an exemplary table that contains a list of IPs Scanned and their Status:

| | |
|---|---|
| IPAddress char (15) NOT NULL, | From NMAP Basic Scan |
| NetBiosName char (50) NULL, | From NMAP Basic Scan |
| DNSName char (50) NULL, | From NMAP Basic Scan |
| MacAddress char (50) NULL, | From NMAP Basic Scan |
| Date char (10) NOT NULL, | From NMAP Basic Scan |
| Time char (8) NOT NULL, | From NMAP Basic Scan |
| Type char (50) NULL, | From NMAP Deep Scan |
| SEPVersion char (20)NULL, | From SCCM Database |
| SCCMScanDate char (25) NULL, | From SCCM Database |
| OperatingSystem char (80)NULL, | From SCCM Database or NMAP Deep Scan |
| Status Char (10) | Determined from (Values in above fields) |

The following table (ScanTemp Table) is an exemplary table that contains a list of IPs Scanned from a basic Nmap scan:

| | |
|---|---|
| IPAddress char (15) NOT NULL, | From NMAP Basic Scan |
| NetBiosName char (50) NULL, | From NMAP Basic Scan |
| DNSName char (50) NULL, | From NMAP Basic Scan |
| MacAddress char (50) NULL, | From NMAP Basic Scan |
| Date char (10) NOT NULL, | From NMAP Basic Scan |
| Time char (8) NOT NULL) | From NMAP Basic Scan |

The following table (DeviceID Table) is an exemplary table that contains Nmap deep scan results:

| | |
|---|---|
| IPAddress char (15) NOT NULL, | From NMAP Deep Scan |
| Type char (50) NULL, | From NMAP Deep Scan |
| OperatingSystem char (80)NULL, | From NMAP Deep Scan |
| Date char (10) NOT NULL, | From NMAP Deep Scan |
| Time char (8) NOT NULL), | From NMAP Deep Scan |

The following table (Segments Table) is an exemplary table that contains segments that were scanned:

| | |
|---|---|
| IPAddress char (15) NOT NULL, | From NMAP Basic Scan |
| ScanCldR char (4) NULL, | From NMAP Basic Scan |
| IPScanned char (6) NOT NULL, | From NMAP Basic Scan |
| Date char (10) NOT NULL, | From NMAP Basic Scan |
| Time char (8) NOT NULL) | From NMAP Basic Scan |

The Scan Table is the main working table, and contains a list of hosts, identifying information and status information. The Status field defines the state of a particular device, e.g., according to the following list:

Scanned=Unit has been Deep Scanned and is in process of getting Status Value Set
Good=Windows based with SCCM and SEP
SEPIssue=Windows based with SCCM and Missing SEP
SCCMIssue=Windows Based Missing SCCM
IDLinux=Linux Based determined by Type and OS from DeepScan
IDNetwork=Router/SwitchWAP/Firewall/Etc. determined by Type and OS from DeepScan
IDOther=Anything Identified by Type and OS from DeepScan that is not in other ID Class
IDPrinter=Printer determined by Type and OS from DeepScan
MVerify=Non Windows Based with Type and Missing OS from DeepScan
Filtered=NetBios, Type, OS, SCCM, SEP are NULL after IP has been DeepScanned
Firewall=Was MVerify or Filtered and found to be behind a firewall.

The ScanTemp Table contains a list of hosts and identifying information from Nmap Scan results. Such information is processed into the Scan Table.

The Segments Table contains a list of segments scanned and total live IPs found on the segment from the basic discovery results. The information in the Segments Table is used to track what has been scanned.

The DeviceID Table contains a list of hosts with the Type and OS fields, which are derived from the deep scan results. The information in the DeviceID Table is used to update records in the Scan Table.

According to an embodiment, the management system 12 also include a module or process for generating reports and pulling data from the main dark matter database 54. The data can be pulled from any data table. For example, data can be pulled by single IP address, multiple IP addresses, IP segment, status types, or all data in the data table. The output can be a file that is readable by any suitable application, e.g., a spreadsheet application. In this manner, the spreadsheet application can therefore be used to further refine the data for any appropriate purpose.

The functions described herein may be implemented in hardware, firmware, or any combination thereof. The methods illustrated in the figures may be implemented in a general, multi-purpose or single purpose processor. Such a processor will execute instructions, either at the assembly, compiled or machine-level, to perform that process. Those instructions can be written by one of ordinary skill in the art following the description of the figures and stored or transmitted on a non-transitory computer readable medium. The instructions may also be created using source code or any other known computer-aided design tool. A non-transitory computer readable medium may be any medium capable of carrying those instructions and includes random access memory (RAM), dynamic RAM (DRAM), flash memory, read-only memory (ROM), compact disk ROM (CD-ROM), digital video disks (DVDs), magnetic disks or tapes, optical disks or other disks, silicon memory (e.g., removable, non-removable, volatile or non-volatile), and the like.

It will be apparent to those skilled in the art that many changes and substitutions can be made to the embodiments described herein without departing from the spirit and scope of the disclosure as defined by the appended claims and their full scope of equivalents.

The invention claimed is:

1. A method for scanning a computing system network for dark matter, wherein dark matter includes one or more unknown, unmanaged, unauthorized or non-standard computing systems or devices, wherein the computing system network includes at least one network computing system having a scanning agent coupled thereto, the method comprising:

establishing a secure and encrypted communication link between a master server and at least one target scanning agent, wherein the at least one target scanning agent is located in the computing system network according to the geographic area of and the proximity to segments of the network computing system that are to be scanned for dark matter;

creating a scanning job for the target scanning agent;

building a scanning job command based on the scanning job;

sending the scanning job command to the target scanning agent, wherein the target scanning agent performs a dark matter scan on at least one segment of the network computing system based on the scanning job command, and wherein the secure and encrypted communication link between the master server and the at least one target scanning agent allows the master server to be unknown to the segment of the network computing system on which the dark matter scan is being performed despite machine-to-machine communications between the master server and the at least one target scanning agent;

receiving scanning job results from the target agent;

parsing through the received scanning job results for identifying information of hosts in the network computing system detected during the scanning job, wherein the parsing includes parsing through the scanning job results to determine a device type and a device operating system of all hosts in the network computing system detected during the scanning job;

determining which detected hosts are known hosts and which detected hosts are unknown hosts based on the identifying information; and comparing the identifying information of the unknown hosts to reference identifying information to determine which of the unknown hosts are dark matter.

2. The method as recited in claim 1, wherein the parsing includes parsing through the scanning job results to determine NetBios names and media access control (MAC) addresses of all hosts in the network computing system detected during the scanning job.

3. The method as recited in claim 1, wherein determining which detected hosts are known hosts and which detected hosts are unknown hosts is based on identifying information from at least one of an Internet Control Message Protocol (ICMP) scan, a basic (NetBios and MAC address) scan and a deep (DeviceID) scan.

4. The method as recited in claim 1, wherein comparing the identifying information of the unknown hosts to reference identifying information to determine which of the unknown hosts are dark matter includes determining whether or not the identifying information compares favorably to at least one of existing SCCM information and existing SEP information.

5. The method as recited in claim 1, wherein master server includes
a first server network connection port for connecting the master server to the scanning agent, the first server network connection port including a server application module for performing the functions of the first server network connection port, and
a second server network connection port, coupled to the first network connection port, that functions as a local-host port for connection with the scanning agent, the second server network connection port including a server application module for performing the functions of the second server network connection port.

6. The method as recited in claim 1, wherein the scanning agent includes
a first client network connection port for connecting the agent to the master server and for listening for incoming commands and instructions from the master server, the first client network connection port including a client application module for performing the functions of the first client network connection port, and
a second client network connection port, coupled to the first network connection port, that functions as a local-host port for connection with the master server, the second client network connection port including a client application module for performing the functions of the second client network connection port.

7. The method as recited in claim 1, wherein establishing a communication link between a master server and at least one target scanning agent comprises creating a secure tunnel between the master server and the agent.

8. The method as recited in claim 7, wherein the secure tunnel is an SSH tunnel channel.

9. The method as recited in claim 7, wherein establishing a communication link between a master server and at least one target scanning agent includes the scanning agent sending a Join request to the master server via the secure tunnel, the master server recognizing and approving the Join request, and the master server sending a Join confirmation to the scanning agent via the secure tunnel.

10. The method as recited in claim 1, wherein the master server includes a scheduling module that creates a scanning job for each network region and manages IP address ranges for each scanning job.

11. The method as recited in claim 1, wherein the master server includes a commander module that assigns network regions to the at least one scanning agent.

12. A management system for scanning a computing system network for dark matter, wherein dark matter includes one or more unknown, unmanaged, unauthorized or non-standard computing systems or devices, wherein the computing system network includes a plurality of network computing systems each having a scanning agent coupled thereto, the system comprising:
a master server, the master server establishing a secure and encrypted communication link with at least one target scanning agent, wherein the at least one target scanning agent is located in the computing system network according to the geographic area of and the proximity to segments of the network computing system that are to be scanned for dark matter,
wherein the master server includes
a scanning engine, the scanning engine including
a scheduling module for creating at least one scanning job for the target scanning agent, and
a commander module for building a scanning job command from scanning job information received from the scheduling module and for sending the scanning job command to the target scanning agent identified in the scanning job command, wherein the target scanning agent performs a dark matter scan on at least one segment of the network computing system based on the scanning job command, and wherein the secure and encrypted communication link between the master server and the at least one target scanning agent allows the master server to be unknown to the segment of the network computing system on which the dark matter scan is being performed despite machineto-machine communications between the master server and the at least one target scanning agent, and at least one parser for receiving scanning job results from the target scanning agent, the parser parsing through the scanning job results for identifying information of all hosts in the network computing system detected during the scanning job, wherein the parser performs a DeviceID scan that parses through the scanning job results to determine a device type and a device operating system of all hosts in the network computing system detected during the scanning job, and wherein the master server determines which detected hosts are known hosts and which detected hosts are unknown hosts based on the identifying information, and wherein the master server compares the identifying information of the unknown hosts to reference identifying information to determine which of the unknown hosts are dark matter.

13. The system as recited in claim 12, wherein the parser performs a NetBios scan that parses through the scanning job results to determine NetBios names and media access control (MAC) addresses of all hosts in the network computing system detected during the scanning job.

14. The system as recited in claim 12, wherein the dark matter server application determines which detected hosts are known hosts and which detected hosts are unknown hosts is based on identifying information from at least one of an Internet Control Message Protocol (ICMP) scan, a basic (NetBios and Mac address) scan and a deep (DeviceID) scan.

15. The system as recited in claim 12, wherein the dark matter server application compares the identifying information of the unknown hosts to reference identifying information to determine which of the unknown hosts are dark matter by determining whether or not the identifying information compares favorably to at least one of existing SCCM information and existing SEP information.

16. The system as recited in claim 12, wherein the master server establishes a communication link with the at least one target scanning agent by creating a secure tunnel between the master server and the agent.

17. The system as recited in claim 16, wherein the secure tunnel is an SSH tunnel.

18. The system as recited in claim 16, wherein the master server establishes a communication link with the at least one target scanning agent by receiving from the target scanning agent a Join request via the secure tunnel, the master server recognizing and approving the Join request, and the master server sending a Join confirmation to the scanning agent via the secure tunnel.

19. A system for scanning a computing system network for dark matter, wherein dark matter includes one or more unknown, unmanaged, unauthorized, or non-standard computing systems or devices, the system comprising:

a master server; and at least one scanning agent coupled to the master server via a secure and encrypted communication link and coupled to at least one network computing system, wherein the at least one target scanning agent is located in the computing system network according to the geographic area of and the proximity to segments of the network computing system that are to be scanned for dark matter, wherein the master server creates a scanning job for the target scanning agent, wherein the master server builds a scanning job command based on the scanning job, wherein the master server sends the scanning job command to the target scanning agent, wherein the target scanning agent receives the scanning job command and performs a dark matter scan on at least one segment of the network computing system coupled to the target scanning agent based on the scanning job command, wherein the secure and encrypted communication link between the master server and the at least one target scanning agent allows the master server to be unknown to the segment of the network computing system on which the dark matter scan is being performed despite machine-to-machine communications between the master server and the at least one target scanning agent, wherein the target scanning agent sends scanning job results to the master server, wherein the master server receives the scanning job results from the target scanning agent, wherein the master server parses through the received scanning job results for identifying information of hosts in the network computing system detected during the scanning job, wherein the master server performs a DeviceID scan that parses through the scanning job results to determine a device type and a device operating system of all hosts in the network computing system detected during the scanning job, wherein the master server determines which detected hosts are known hosts and which detected hosts are unknown hosts based on the identifying information, and wherein the master server compares the identifying information of the unknown hosts to reference identifying information to determine which of the unknown hosts are dark matter.

* * * * *